(12) United States Patent
Tolinski

(10) Patent No.: US 6,315,356 B1
(45) Date of Patent: Nov. 13, 2001

(54) SUNSHADE/SUNSCREEN COMBO

(75) Inventor: Roch J. Tolinski, Howell, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/565,945

(22) Filed: May 5, 2000

(51) Int. Cl.$^7$ ........................................................ B60J 7/00
(52) U.S. Cl. ................................................................ 296/214
(58) Field of Search ................................................ 296/214

(56) References Cited

U.S. PATENT DOCUMENTS

| | | | | |
|---|---|---|---|---|
| 4,320,921 | * | 3/1982 | Schatzler | 296/214 X |
| 4,546,693 | * | 10/1985 | McTaw, Jr. | 296/216 |
| 4,650,244 | * | 3/1987 | Boots | 296/214 |
| 4,717,200 | * | 1/1988 | Kruger | 296/214 |
| 4,852,938 | * | 8/1989 | Hirshberg et al. | 296/214 |
| 4,981,290 | * | 1/1991 | Huyer | 296/214 |
| 5,005,899 | * | 4/1991 | Clenet | 296/214 |
| 5,609,387 | * | 3/1997 | Stallfort et al. | 296/214 |
| 6,012,767 | * | 1/2000 | Farmont | 296/214 |
| 6,179,034 | * | 1/2001 | Fuss | 296/214 X |

FOREIGN PATENT DOCUMENTS

| | | | | |
|---|---|---|---|---|
| 118032 | * | 11/1959 | (DE) | 296/214 |
| 002636749 A | * | 2/1978 | (DE) | 296/216.02 |
| 404090924 A | * | 3/1992 | (JP) | 296/214 |

* cited by examiner

Primary Examiner—Joseph D. Pape
Assistant Examiner—Lori L. Coletta
(74) Attorney, Agent, or Firm—Carlson, Gaskey & Olds

(57) ABSTRACT

A sunroof apparatus has a window, a sunscreen, and a sunshade. The sunshade is opaque and blocks all light from entering. The sunscreen has a plurality of openings for allowing a filtered transmission of light via the sunroof. The sunshade and sunscreen are able to be moved independent of each other to provide a driver a greater number of lighting options. The sunscreen also provides an air dampening effect when it is closed and when the window is open, thereby lessening the turbulence of the air as well as the wind noise.

2 Claims, 2 Drawing Sheets

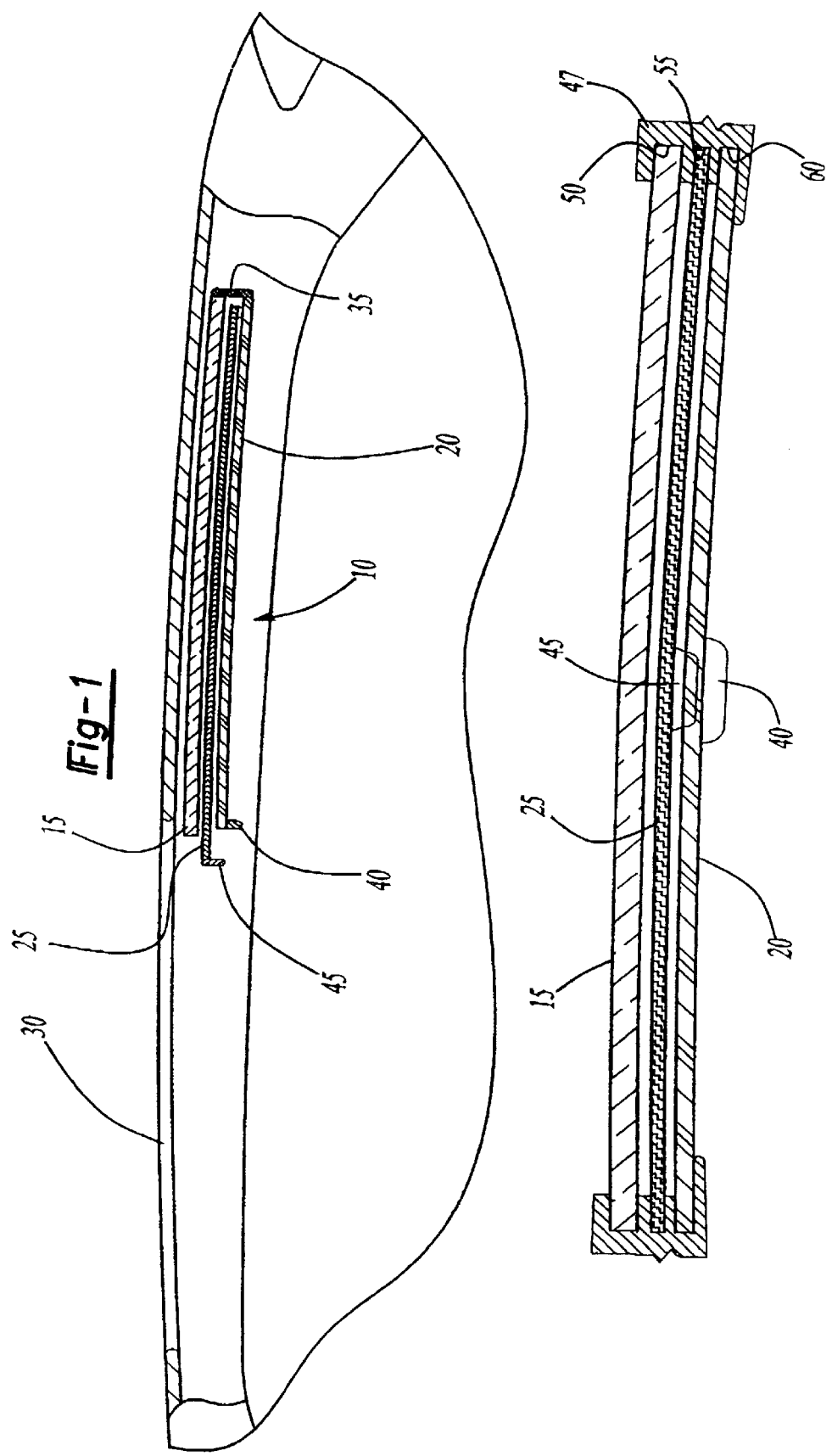

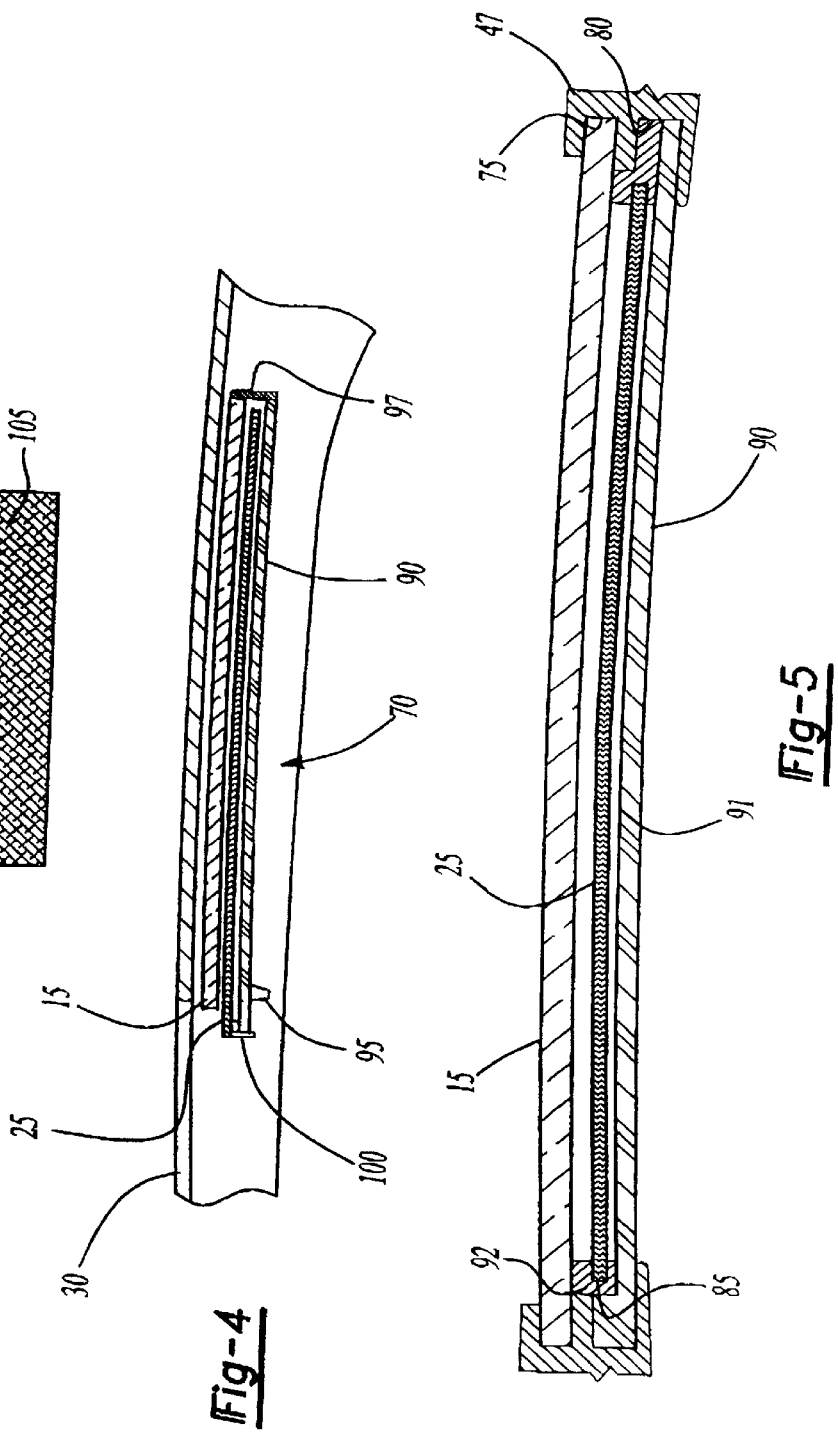

SUNSHADE/SUNSCREEN COMBO

BACKGROUND OF THE INVENTION

The present invention relates to a sunroof having both a sunshade and a sunscreen, wherein the sunscreen may move independently of the sunshade.

Sunroof sunshades are routinely included as a component of a sunroof system. The sunshade is a solid member that blocks light from entering the vehicle via the glass window of the sunroof. The sunshade is typically mounted on the inside of the sunroof and is matched to the interior headliner for an aesthetically pleasing appearance. The sunshade is linked to the glass window of the sunroof so that it is retracted when the window is opened to avoid damaging the sunshade.

The aforementioned sunshades are deficient in that they do not allow a limited or filtered light into the vehicle. Known sunshades are opaque. Therefore, a driver is left with the limited choice of allowing full light to enter the vehicle via the sunroof when the sunshade is retracted or to allow no light to enter when the sunshade is closed.

The aforementioned sunshades are also deficient, as they must be retracted when the sunroof is opened, to prevent damage to the sunshade. Thus, there is no filtering or shading when the sunroof is open.

It is an object of the present invention to cure those deficiencies outlined above by providing a sunshade/sunscreen combination.

SUMMARY OF THE INVENTION

In a disclosed embodiment a vehicle sunroof apparatus has a window, a sunscreen and a sunshade. The sunscreen allows passage of light and wind, and is positioned between the window and sunshade to provide additional lighting options. The sunscreen is movable independently of the window or sunshade, thereby providing a filtered light and air flow when the window is in the open position. The sunshade is a opaque member that does not allow light to enter the vehicle via the sunroof when the sunshade is in its closed position.

The sunscreen is a relatively planar member having a plurality of holes to provide a source of filtered light, via the sunroof. The sunscreen also serves as an air dispenser when the sunscreen is closed and the window is in its open position. This damping effect reduces the wind noise and overall turbulence of the air entering from the open window.

These and other features of the present invention can be best understood from the following specification and drawings.

BRIEF DESCRIPTION OF THE DRAWINGS

FIG. 1 is a side sectional view of a first embodiment of the sunshade/sunscreen combination.

FIG. 2 is a front sectional view of a first embodiment of the sunshade/sunscreen combination.

FIG. 3 is a top view of a sunscreen.

FIG. 4 is a side sectional view of a second embodiment of the sunshade/sunscreen combination.

FIG. 5 is a front sectional view of a second embodiment of the sunshade/sunscreen combination.

DETAILED DESCRIPTION OF THE PREFERRED EMBODIMENT

A first embodiment of the sunshade/sunscreen combination is shown generally at 10 in FIG. 1. The sunshade/sunscreen combination includes a window 15, a sunshade 20, and a sunscreen 25. The window 15 is shown sectionally after it has dropped from the window opening 30 and had moved horizontally into its retracted position. The sunroof window 15 may be of any design known in the art.

The sunshade 20 is an opaque member that does not allow sunlight to pass through it. The sunshade 20 is generally colored to match the interior trim of the vehicle, and typically may be made of a material similar to the material of the vehicle headliner. The sunshade 20 includes a window engaging portion 35 that engages the window 15 when opening to also open the sunshade. Thus, the sunshade cannot be closed when the window is opened.

As best shown in FIG. 2, the sunscreen 25 occupies the space between the sunshade 20 and window 15. As shown in FIG. 1, the sunscreen 25 does not include a window engaging portion as does the sunshade. This arrangement allows for the sunshade 25 to remain in a closed position independent of the position of the window 15. Sunscreen 25 includes a handle 45 that extends downward to allow a driver to move the sunscreen 25 between a closed and a retracted position. The sunscreen handle 45, as shown in FIG. I is positioned forward of the sunshade handle 40 to allow for independent movement of the sunshade 20 and sunscreen 25. The sunscreen 25, as shown in FIG. 3 is a semi-rigid member with a plurality of openings 105 formed therein, to allow for light and wind passage. The sunscreen 25 has a plurality of openings 105. A material such as a screen material may be utilized. It is to be understood that the plurality of openings 105 may be of numerous configurations such as, slots, squares, rectangles, circles, etc. The sunscreen 25 opening 105 shape is not critical, as long as, the opening allows for light and air to move through the sunscreen 25. The sunscreen 25 may be made of a thermoformed plastic or other suitable material.

As shown in FIG. 2, the window 15, sunscreen 25 and sunshade 20 are held within opposing channels 50, 55, 60 formed in the sunroof reinforcing member 47, respectively.

The opposing elements 50, 55, 60 allow for horizontal movement of the various elements i.e., window 15, sunscreen 25, sunshade 20, while maintaining the spatial relationship of the elements. The channels 50, 55, 60 further facilitate the independent movement of the various elements by maintaining a separate channel for each element.

A second embodiment of the present invention is shown at 70 in FIG. 4. The alternative embodiment includes a window 15, sunscreen 25 and an integrally formed sunshade 90.

The sunscreen 25 is of a similar design as that of the previously detailed first embodiment, with the exception that it is integrally housed within the sunshade 90. The window 15, as with the first embodiment may be of any configuration known in the art. The sunshade 90, includes a window engaging portion 97, similar to that of the first embodiment, to retract the sunshade 90 when the window 15 is opened.

As shown in FIG. 5, the sunshade 90 has a planar portion 91 and a notched portion 92, with integrally formed opposing channels 85. The opposing channels 85 formed in the sunshade 90 house the sunscreen 25, and allow for movement of the sunscreen 25 independent of the sunshade 90.

As shown in FIG. 4, the sunscreen 25 has a handle 100 that is positioned forward of the handle 95 of the sunshade 90 to facilitate independent movement of the elements.

As shown in FIG. 5, the second embodiment 70 includes opposing channels 75, 80 formed in the reinforcing member 47 to house the window 15 and sunshade 90, respectively. As with the first embodiment, the sunscreen 25 is effectively positioned between the window 15 and the sunshade 90 with the exception that the channel 85 housing the sunscreen 25 integrally formed with the sunshade 90.

With this embodiment, when the sunshade 90 is moved rearwardly it carries the sunscreen 25. However, the sunscreen 25 can be moved independently to the closed position.

While preferred embodiments are disclosed, a worker in this art would understand that various modifications would come within the scope of the invention. Thus, the following claims should be studied to determine the true scope and content of this invention.

What is claimed is:

1. A vehicle sunroof apparatus comprising:

a window;

an opaque sun shade positioned inside of said window and having a handle extending downwardly and further including a window engagement portion for retracting said sun shade when said window is open;

a sunscreen having a handle extending downwardly and positioned between said window and said sun shade, said sunscreen having a plurality of holes formed therein for allowing passage of air, said sunscreen remaining in a forward position when said sun shade is retracted.

2. A vehicle sunroof apparatus comprising:

a window;

an opaque sun shade positioned inside of said window and having a handle extending downwardly and further including a window engagement portion for retracting said sun shade when said window is open;

a sunscreen having a handle extending downwardly and positioned between said window and said sun shade; and fixed reinforcing members having channels for supporting said window, said sun shade and said sunscreen at each of two lateral sides for allowing independent movement of, said sun shade and said sunscreen.

* * * * *